Jan. 16, 1962     J. A. LORETT ET AL     3,016,703
COMBUSTION CHAMBERS

Filed Jan. 27, 1958                          5 Sheets-Sheet 3

Inventors:
Jerzy Andre Lorett,
Clifford Morris
By: Stevens, Davis, Miller & Mosher
Attorneys United States Patent Office 3,016,703
Patented Jan. 16, 1962

3,016,703
COMBUSTION CHAMBERS
Jerzy Andre Lorett, Leicester, and Clifford Morris, Whetstone, England, assignors to The English Electric Company Limited, London, England, a British company
Filed Jan. 27, 1958, Ser. No. 711,482
Claims priority, application Great Britain Feb. 18, 1957
10 Claims. (Cl. 60—39.65)

This invention relates to louvred gas turbine combustion chambers. Louvred flame tubes are usually composed of complete rings either in the form of a frustrum of a cone or a flat plate annulus and either some or all of the same have to be ribbed, corrugated or dimpled to form air passages. Particularly in larger sizes it becomes difficult to produce these louvred flame tubes to the required degree of accuracy which when not attained may lead to uneven air flow patterns and subsequent local overheating. Furthermore, if it is desired to retain the advantages of a louvred flame tube, the dimensions of the louvres of which cannot be increased much, even when the diameter of the combustion chamber increases. This may cause the individual complete rings to be very flexible and lead to dimensional instability of the whole louvred flame tube with resultant local variation in air-passage width and with attendant local variations in flame tube temperature and to an uneven flame.

It is an object of the present invention to provide a form of louvred gas turbine combustion chamber which is free from these disadvantages and which may be readily manufactured to the required degree of accuracy. Furthermore, in the new louvred gas turbine combustion chamber the inward passage of air through the louvred wall is more easily controlled to give the required flow pattern.

A gas turbine combustion chamber according to the invention has a polygonal louvred flame tube made up from flat louvre packets stacked axially in line and distributed circumferentially. The packets are assembled for example from alternate flat and corrugated rectangular strips joined together by welding to form rigid units. The lateral edges of the packets are grooved in one form of the invention and engage with corresponding fixed T-profile bars which run parallel to the axial direction and serve to locate the packets and to seat their lateral edges. In another form the lateral edges of the packets are welded to fixed U-profile strips running parallel to the axial direction. The edges of the said strips define the faces of said packets, and the inwardly facing edges thereof may be slotted across the face of the packet to give freedom for differential thermal expansion.

In order that the invention may be clearly understood and readily carried into effect some embodiments thereof will now be described by way of example with reference to the accompanying drawings, in which.

Figure 3:
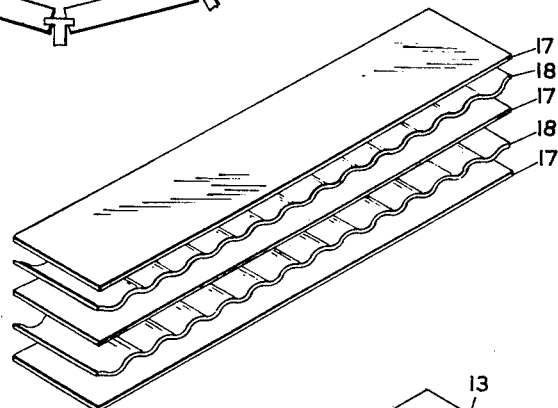
FIG. 3 is a perspective exploded view of part of a louvre packet.
Figure 5:
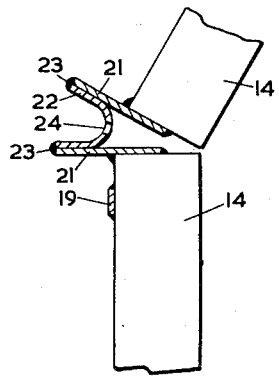
Figure 12:
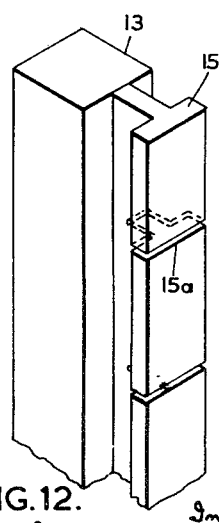
Figure 6:
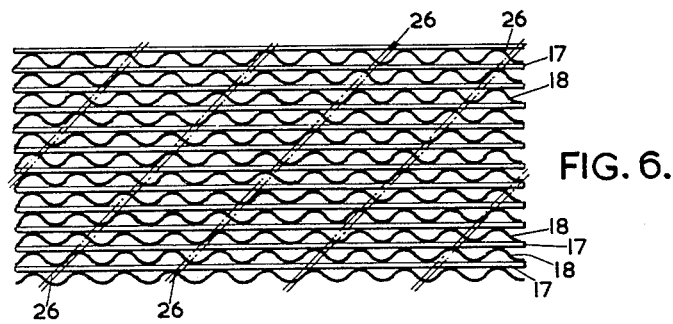
Figure 7:
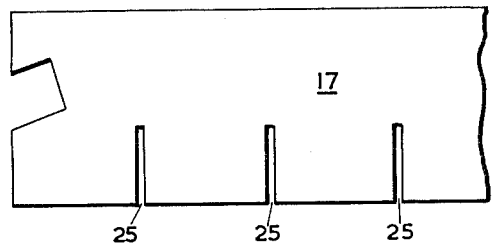
Figures 8, 9, 10:
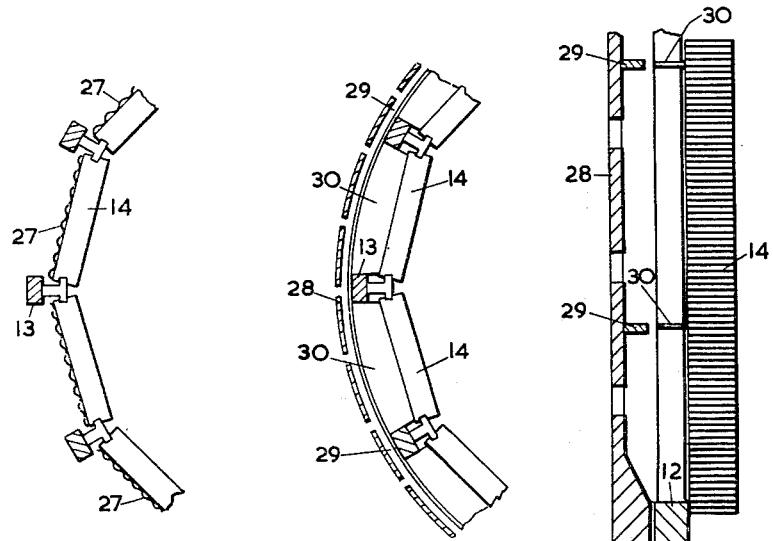
Figure 11:
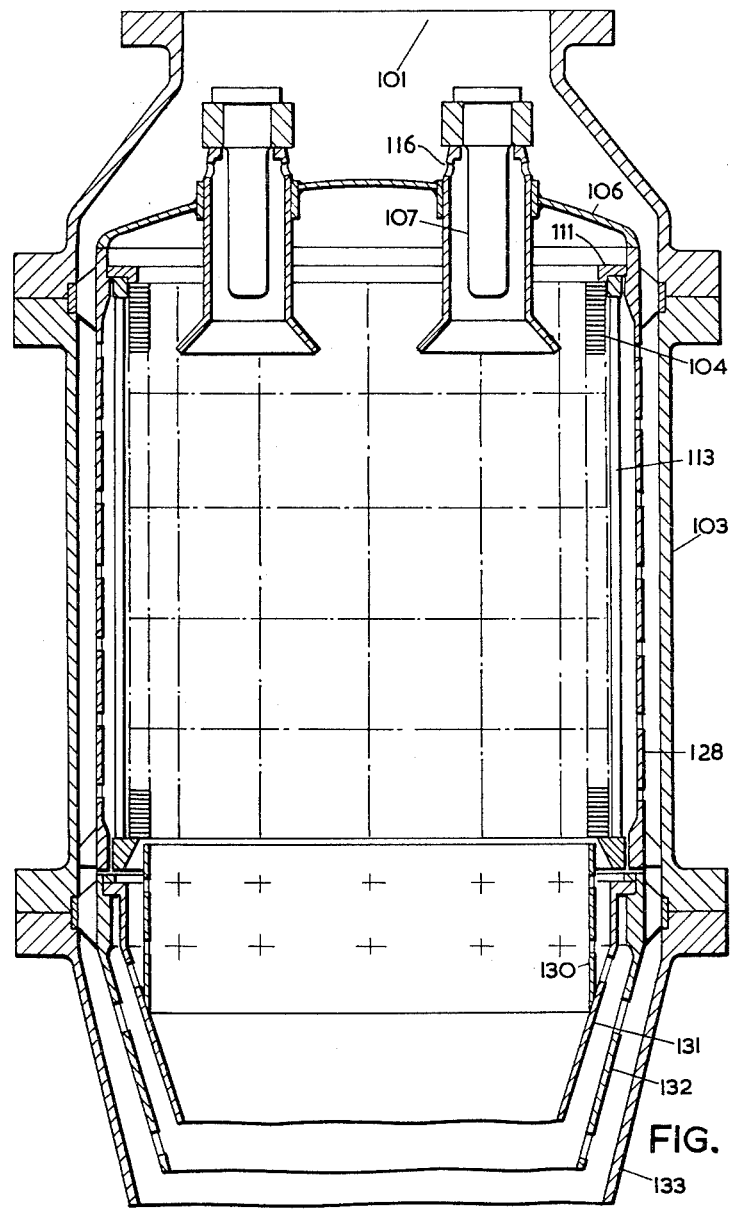
Figure 13:
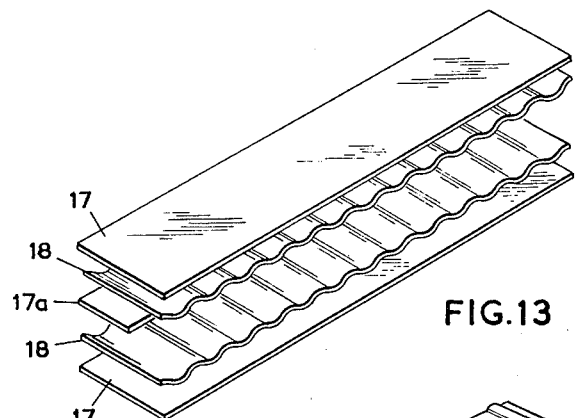
Figure 14:
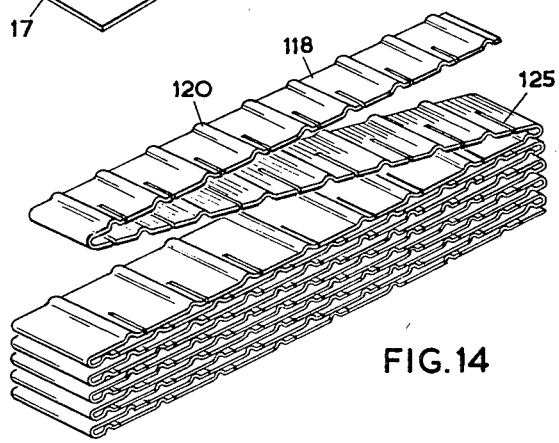
Figure 15:
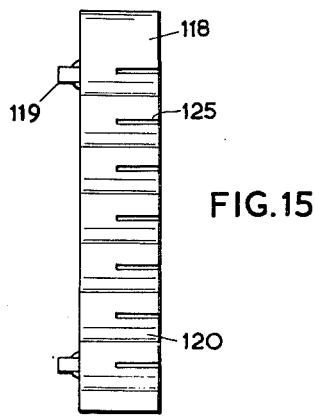

FIG. 5 shows in plan view an alternative method of locating and sealing the packets, FIG. 6 is an end view of a packet, looking at the inner face thereof, FIG. 7 is a part plan view of an element of a packet, FIG. 8 is a detail in plan view of part of a louvred flame tube showing air metering arrangement, FIG. 9 is a detail in plan view of an alternative method of air metering, FIG. 10 is a part elevation corresponding to FIG. 9, FIG. 11 is an axial section of another form of combustion chamber embodying the invention, FIG. 12 is a perspective view of a T-profile bar, FIG. 13 is a modification of the embodiment shown in FIG. 3, FIG. 14 is a perspective view of a packet being made of corrugated strip materdal folded zigzag-wise, and FIG. 15 is a plan view on a finished packet of the kind of FIG. 14.

Figure 1:
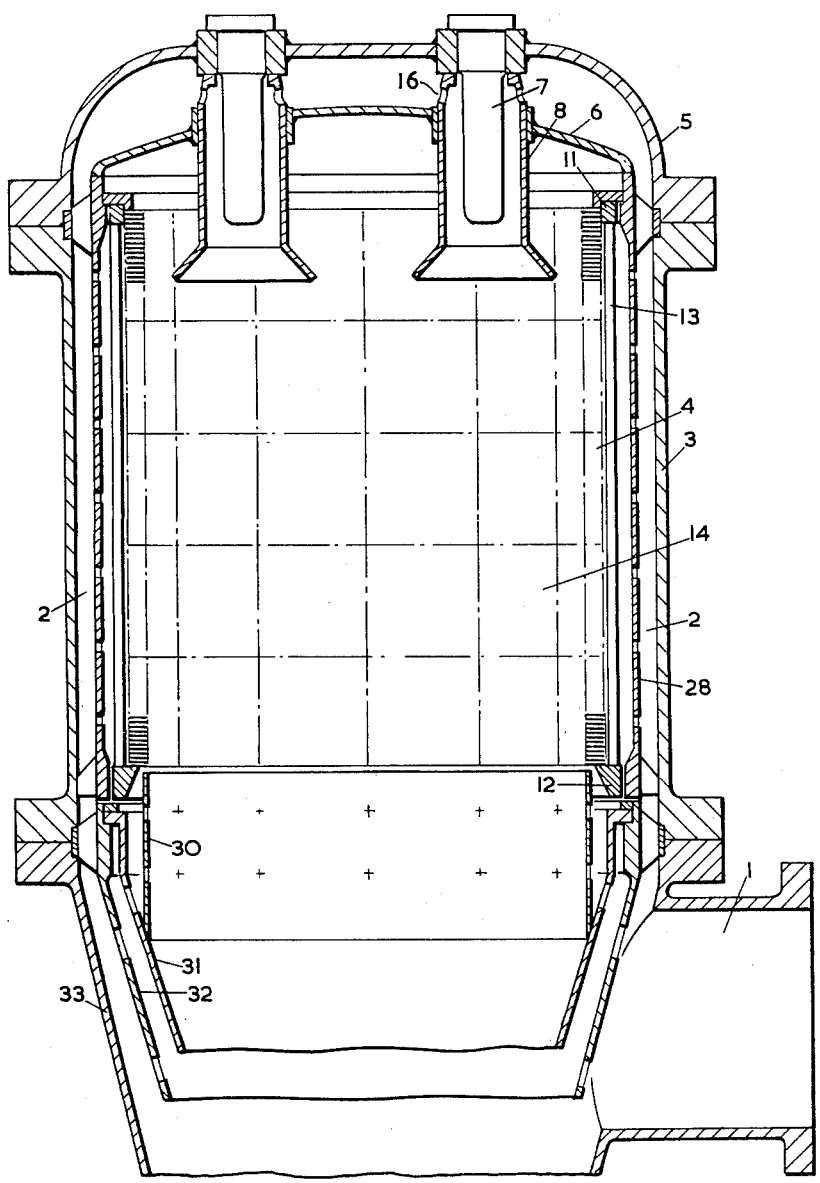
FIG. 1 is an axial section through a gas turbine combustion chamber.

Referring firstly to FIG. 1, air enters the combustion chamber via the entry port 1 and fills the annular space 2 between the outer shell 3 and the louvred flame tube 4. The shell is closed at the top by a domed cover 5 and the louvred flame tube is closed by an inner cover 6. Burners 7 extend into the combustion zone through shrouds 8 having ports 16 for primary air. An air metering shell 28 between the outer shell 3 and the louvred flame tube 4 regulates the inward flow of air through the louvred wall thereof into the combustion zone. The louvred flame tube 4 is assembled from packets 14. End rings 11 and 12 and bars 13 form a cage and hold the assembly rigid.

The louvred flame tube 4 discharges the combustion gases internally through a cylindrical screen 30 and two co-axial frusto-conical screens 31 and 32 arranged within the outer frusto-conical casing 33. The inner screen 31 extends down to and makes a seal with the turbine inlet (not shown) to prevent short circuiting of the air. Tertiary air flows from this casing through holes in the frusto-conical screens 31 and 32 into the annular space surrounding the cylindrical screen 30 and hence through perforations in the latter into the main gas stream.

Figure 2:
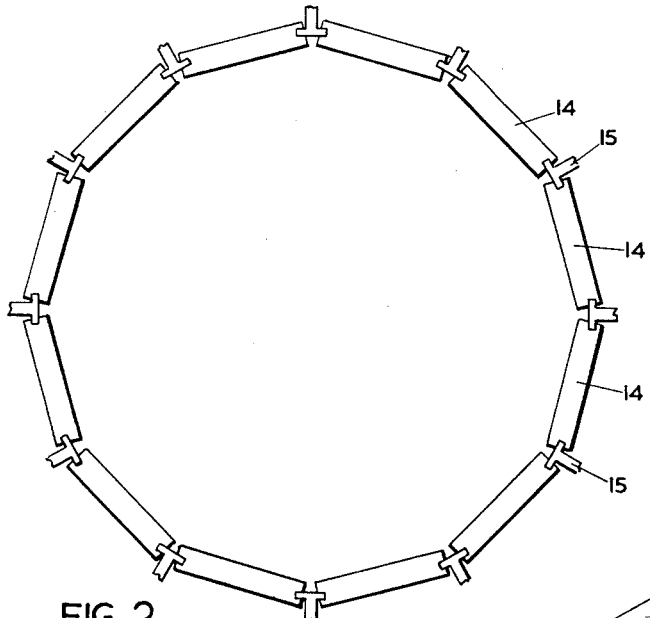
FIG. 2 is a plan view of the polygon of a louvred flame tube.
Figure 4:
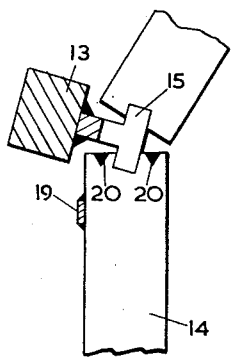
FIG. 4 is a detail in plan view of the ends of a packet and T-bars.

FIG. 2 shows a plan view of the louvred flame tube. Each packet 14 has a groove at each end which engages with the shoulders of the T-bars 15. FIG. 4 shows this edge fitting in detail. The T-bar 15 is welded on to a vertical bar 13 and has for example saw cuts 15a (FIG. 12) at intrevals to relieve thermal stresses and to allow a flow of cooling air. Alternatively the T-profile bars may be made in short lengths welded to the bars 13 so as to leave small gaps. Further, the gaps or slots may, with advantage, be oblique rather than horizontal. This arrangement gives considerable support for a loose plate should one break free.

The packets 14, FIGS. 3, 6 and 7, are made up of alternate flat plates 17 and corrugated plates 18, the edges of which plates 17, 18 define the faces of the said packets 14. These plates are held together by ribs 19 (FIGS. 4, 5), welded down the outer faces of the packets 14. Additional fixing is achieved by welds 20 on the lateral edges of the packets. There may be two such welds on each end face as shown in FIG. 4 or only one, depending on the loading of the combustion chamber.

FIG. 5 shows an alternative method of mounting the packets 14. Flat plates 21 are welded to the longitudinal edges of the packets and are wide enough to protrude outward beyond the outer face of the packet. The edges of the flat plates 21 of the two adjoining packets are joined by a U-profile member 22 lying between them and welded to them at the outer longitudinal edges at 23. The curved portion of the U is pierced by holes 24 to allow air to pass so as to cool the edges of the packets 14 and the plates 21 and 22. A cage of bars 13 and end rings 11, 12 is provided as in the embodiment according to FIG. 4.

The plates 17 and 18 may have slots 25 (FIG. 7) extending back from their inner edges giving some freedom of movement to relieve thermal stresses. These slots 25 may be punched in the plates 17, 18, before assembly, and the packets 14 may be assembled with staggered slots. Alternatively, the packets 14 may be assembled with the plates unslotted. The assembled packet then has oblique grooves 26 (FIG. 6) cut in its inner face and achieving the same result as staggered slots 25 of FIG. 7.

Referring to FIGS. 8, 9, and 10, these illustrate air metering arrangements. It is necessary to be able to control the amount of secondary air flowing through the louvred flame tube at sections along its length. This may be achieved by fixing a metering sheet 27 to the outer face of each packet (FIG. 8). This sheet may, for example be of wire gauze, expanded metal or perforated sheet by using sheets of different mesh or ratio of perforations to the solid area the desired airflow pattern can be achieved.

Another arrangement makes use of a separate conventional metering shell 28 which entirely surrounds the louvre pack assembly (FIGS. 1, 9, and 11). To reduce cross flows in the zone between the louvred flame tube 4 and the metering shell 28 the latter carries circumferential inwardly extending ribs 29 (FIGS. 9, 10) which co-operate with plates 30 extending from the pockets 14 between the bars 13.

The ribs 29 are made thick enough to ensure that the thinner plates 30 of the packets 14 co-operate with them to form a restriction for the air flow under all conditions of manufacturing tolerance and differential thermal expansion.

FIG. 11 shows a gas turbine combustion chamber of the "straight-through" type embodying the invention. In this type of chamber the air enters at 101 at one end of the chamber 103 and secondary air flows inwardly through the louvred flame tube 104 into the combustion zone and leaves the chamber at the opposite end. Otherwise the construction is similar to the chamber shown in FIG. 1. The reference numbers in FIG. 11 are all raised 100 as compared with the corresponding one of FIG. 1.

As shown in FIG. 13 the sandwich composed of alternating flat plates 17 and corrugated plates 18 some flat plates 17a spaced throughout the packet at intervals may be made of reduced, say half, width. This helps to allow linear expansion at the edge of the packet.

Obviously the packets may be formed in other ways than that shown. They may, for example, be constructed from dimpled or corrugated metal ribbon folded to form a rectangular packet.

Such an embodiment is shown in FIGS. 14 and 15: a continuous metal strip 118, having transverse ridges 120 and transverse slots 125 arranged between the same extending about half the width thereof, is folded concertina fashion in such a manner that the ridges 120 of one layer are offset from those of the adjacent layers and abut flat portions of the latter. Ribs 119 are welded to the outer face of the packet thus formed, similar to the ribs 19 of FIGS. 4 and 5. The slots 125 facilitate thermal expansion of each layer independently of the others.

What we claim as our invention and desire to secure by Letters Patent, is:

1. A gas turbine combustion chamber comprising in combination: an outer shell, a polygonal louvred flame tube having packets, each of said packets comprising strips having their flat sides spaced from one another to form passageways therebetween, the respective edges of said strips defining the inner and outer walls of said packets such that the flow of secondary air through said passageways is transverse to the axis of said chamber, the said packets being stacked so as to form the sides of said polygonal louvred flame tube and guiding the secondary air inwardly into the interior of said flame tube substantially uniformly over the full axial length thereof, clamping and locating elements clamping the said packets to one another and locating the same within the said outer shell, and at least one burner issuing into the interior of said flame tube.

2. A gas turbine combustion chamber as claimed in claim 1, wherein the said packets are of cellular construction having ducts transverse of the axis of said flame tube and are joined together by welding to form rigid units.

3. A gas turbine combustion chamber as claimed in claim 1, wherein the inwardly facing edges of said strips are slotted across the walls of said packets to give freedom of differential thermal expansion.

4. A gas turbine combustion chamber as claimed in claim 1, wherein the said strips are continuous and folded upon themselves zig-zag fashion and have embossings spacing the flat sides of adjacent layers of said strips from one another.

5. A gas turbine combustion chamber as claimed in claim 1, comprising ribs welded down the outer faces of said stacked packets joining the same together to form rigid units.

6. A gas turbine combustion chamber as claimed in claim 1, wherein the said strips have welds on their lateral edges joining them together to form rigid units.

7. A gas turbine combustion chamber as claimed in claim 1, comprising a holed air metering screen surrounding said louvred polygonal flame tube so to control the flow of secondary air from the said outer shell inwardly into the said louvred polygonal flame tube.

8. A gas turbine combustion chamber comprising in combination, an outer shell, a polygonal louvred flame tube having flat louvre element packets lying in planes transverse of the axis of the said flame tube, and stacked axially in line and distributed circumferentially, guiding secondary air inwardly into the interior of the said flame tube, each of the said packets containing alternate flat and corrugated rectangular plates joined together by welding to form rigid units, some of the said flat plates spaced throughout the said packets being of reduced width, clamping and locating means clamping the said stacked packets to one another and locating the same within the said outer shell, and at least one burner issuing into the interior of the said flame tube.

9. A gas turbine combustion chamber comprising in combination, an outer shell, a polygonal louvred flame tube having flat louvre element packets lying in planes transverse of the axis of the said flame tube, and stacked axially in line and distributed circumferentially, guiding secondary air inwardly into the interior of the said flame tube, clamping and locating means clamping the said stacked packets to one another and locating the same within the said outer shell, and at least one burner issuing into the interior of the said flame tube, a holed air metering screen surrounding the said polygonal flame tube so as to control the flow of secondary air from the said outer shell to the said flame tube, internal circumferential ribs welded on the said air metering screen, and plates projecting outwardly from the said packets in juxtaposition of the said ribs so as to define air gaps with the latter.

10. A gas turbine combustion chamber comprising in combination, an outer shell, a polygonal louvred flame tube having flat louvre element packets lying in planes transverse of the axis of the said flame tube, and stacked axial in line and distributed circumferentially, guiding secondary air inwardly into the interior of the said flame tube, clamping and locating means clamping the said stacked packets to one another and locating the same within the said outer shell, and at least one burner issuing into the interior of the said flame tube a holed air metering screen surrounding the said polygonal flame tube so as to control the flow of secondary air from the said outer shell to the said flame tube, internal circumferential ribs welded on the said air metering screen, and plates projecting outwardly from the said packets in juxtaposition of the said ribs so as to define air gaps with the latter, the width of the said internal ribs being larger than that of the said juxtaposed plates so as to preserve a suitable air gap therebetween even in case of their being offset in the axial direction.

References Cited in the file of this patent

UNITED STATES PATENTS

| | | | |
|---|---|---|---|
| 2,109,262 | Dufour | Feb. 22, | 1938 |
| 2,361,691 | Jendrassik | Oct. 31, | 1944 |
| 2,446,059 | Peterson | July 27, | 1948 |
| 2,617,255 | Niehus | Nov. 11, | 1952 |
| 2,651,912 | Abbott | Sept. 15, | 1953 |
| 2,654,219 | Zaba | Oct. 6, | 1953 |

FOREIGN PATENTS

| 467,264 | Canada | Aug. 8, 1950 |
|---|---|---|